(12) United States Patent
Miura et al.

(10) Patent No.: US 11,283,990 B2
(45) Date of Patent: Mar. 22, 2022

(54) DISPLAY CONTROL DEVICE, IMAGING DEVICE, AND DISPLAY CONTROL METHOD

(71) Applicant: SONY CORPORATION, Tokyo (JP)

(72) Inventors: Shunsuke Miura, Tokyo (JP); Akiko Yoshimoto, Tokyo (JP); Hyongmyong Kang, Chiba (JP)

(73) Assignee: SONY CORPORATION, Tokyo (JP)

(*) Notice: Subject to any disclaimer, the term of this patent is extended or adjusted under 35 U.S.C. 154(b) by 20 days.

(21) Appl. No.: 16/603,882

(22) PCT Filed: Feb. 16, 2018

(86) PCT No.: PCT/JP2018/005370
§ 371 (c)(1),
(2) Date: Oct. 9, 2019

(87) PCT Pub. No.: WO2018/193698
PCT Pub. Date: Oct. 25, 2018

(65) Prior Publication Data
US 2020/0120264 A1 Apr. 16, 2020

(30) Foreign Application Priority Data
Apr. 18, 2017 (JP) .............................. JP2017-081995

(51) Int. Cl.
*H04N 5/232* (2006.01)
*H04N 5/783* (2006.01)

(52) U.S. Cl.
CPC ..... *H04N 5/23216* (2013.01); *H04N 5/23245* (2013.01); *H04N 5/232939* (2018.08); *H04N 5/783* (2013.01)

(58) Field of Classification Search
CPC ......... H04N 5/23216; H04N 5/232939; H04N 5/772; H04N 5/783; H04N 1/0035; H04N 1/2112; H04N 2201/3247; H04N 1/215; H04N 5/23245; H04N 5/232941; G03B 17/18; G09G 5/00; G09G 5/36
See application file for complete search history.

(56) References Cited

U.S. PATENT DOCUMENTS

| 6,862,106 B1 | 3/2005 | Matsushima | |
|---|---|---|---|
| 2004/0156624 A1* | 8/2004 | Kent, Jr. | H04N 5/775 386/263 |
| 2005/0188189 A1* | 8/2005 | Yeung | G06F 9/485 713/1 |
| 2006/0019607 A1* | 1/2006 | Kim | H04M 1/72527 455/67.14 |

(Continued)

FOREIGN PATENT DOCUMENTS

| JP | 2001-078062 A | 3/2001 |
|---|---|---|
| JP | 2005-102335 A | 4/2005 |

(Continued)

OTHER PUBLICATIONS

International Search Report and Written Opinion of PCT Application No. PCT/JP2018/005370, dated Apr. 3, 2018, 10 pages of ISRWO.

*Primary Examiner* — Abdelaaziz Tissire
(74) *Attorney, Agent, or Firm* — Chip Law Group

(57) ABSTRACT

A display control device includes a controller configured to perform control displaying, on a display, whether or not shooting is performed at a shooting rate slower than a predetermined shooting rate, after the shooting starts at the predetermined shooting rate.

18 Claims, 15 Drawing Sheets

(56) References Cited

U.S. PATENT DOCUMENTS

| | | | | |
|---|---|---|---|---|
| 2006/0133775 | A1* | 6/2006 | Ju | H04N 21/4402 386/295 |
| 2009/0083668 | A1* | 3/2009 | Aizawa | G06F 3/0482 715/838 |
| 2009/0089519 | A1* | 4/2009 | Dohmann | G06Q 20/35765 711/156 |
| 2010/0289917 | A1* | 11/2010 | Hosokawa | H04N 1/215 348/222.1 |
| 2010/0296806 | A1* | 11/2010 | Seo | H04N 5/232935 396/236 |
| 2011/0242360 | A1* | 10/2011 | Mori | H04N 5/907 348/231.1 |
| 2011/0298962 | A1* | 12/2011 | Shiohara | H04N 5/232939 348/333.02 |
| 2012/0127332 | A1* | 5/2012 | Park | H04N 5/232935 348/222.1 |
| 2014/0099074 | A1* | 4/2014 | Kano | H04N 21/4312 386/241 |
| 2017/0302851 | A1* | 10/2017 | Yu | H04N 5/783 |
| 2019/0141244 | A1* | 5/2019 | Yanai | H04N 5/915 |
| 2019/0165590 | A1* | 5/2019 | Ye | H01M 10/488 |

FOREIGN PATENT DOCUMENTS

| | | | |
|---|---|---|---|
| JP | 2005-136655 | A | 5/2005 |
| JP | 2005136655 | A * | 5/2005 |
| JP | 2008-219319 | A | 9/2008 |
| JP | 2014-027438 | A | 2/2014 |
| WO | 2012/153823 | A1 | 11/2012 |

* cited by examiner

DISPLAY CONTROL DEVICE, IMAGING DEVICE, AND DISPLAY CONTROL METHOD

CROSS REFERENCE TO RELATED APPLICATIONS

This application is a U.S. National Phase of International Patent Application No. PCT/JP2018/005370 filed on Feb. 16, 2018, which claims priority benefit of Japanese Patent Application No. JP 2017-081995 filed in the Japan Patent Office on Apr. 18, 2017. Each of the above-referenced applications is hereby incorporated herein by reference in its entirety.

TECHNICAL FIELD

The present disclosure relates to a display control device, an imaging device, and a display control method.

BACKGROUND ART

Conventionally, an imaging device capable of performing continued shooting (hereinafter, referred to as continuous shooting as appropriate) has been known (see, for example, Patent Document 1 below).

CITATION LIST

Patent Document

Patent Document 1: Japanese Patent Application Laid-Open No. 2008-219319

SUMMARY OF THE INVENTION

Problems to be Solved by the Invention

The continuous shooting performance is defined by a shooting rate, which is the number of frames (number of frames) that can be shot per unit time (for example, per second). The shooting rate may decrease depending on a free space (remaining capacity) of a buffer memory where images captured by the continuous shooting are stored. In a case where the shooting rate decreases, since there is a possibility that a decisive scene loses or the shooting intended by a user cannot be performed, it is desirable to inform the user in advance of the timing at which the shooting rate decreases and to prompt the user to recover the capacity of the buffer memory.

Therefore, an object of the present disclosure is to provide a display control device, an imaging device, and a display control method that inform a user whether or not shooting is performed at a shooting rate slower than a predetermined shooting rate in continuous shooting.

Solutions to Problems

The present disclosure relates to, for example,
a display control device including
a controller configured to perform control displaying, on a display, whether or not shooting is performed at a shooting rate slower than a predetermined shooting rate, after the shooting starts at the predetermined shooting rate.

In addition, the present disclosure relates to, for example,
an imaging device including
an imager, and
a controller configured to perform control displaying, on a display, whether or not shooting is performed at a shooting rate slower than a predetermined shooting rate, after the shooting starts at the predetermined shooting rate.

In addition, the present disclosure relates to, for example,
a display control method including
performing, by a controller, control displaying, on a display, whether or not shooting is performed at a shooting rate slower than a predetermined shooting rate, after the shooting starts at the predetermined shooting rate.

Effects of the Invention

According to at least the embodiment of the present disclosure, whether or not the shooting is performed at the shooting rate slower than the predetermined shooting rate in the continuous shooting can be informed to the user. Further, the effects described here are not necessarily limited, and any of the effects described in the present disclosure may be used. In addition, the contents of the present disclosure are not interpreted to be limited to the above-mentioned effects.

MODE FOR CARRYING OUT THE INVENTION

Hereinafter, embodiments and the like of the present disclosure will be described with reference to the drawings. Further, the description will be made in the following order.
<1. One Embodiment>
<2. Modified Example>
The embodiments and the like described below are preferred specific examples of the present disclosure and the contents of the present disclosure are not limited to these embodiments and the like.

1. One Embodiment

[Configuration Example of Imaging Device]

Figure 1:
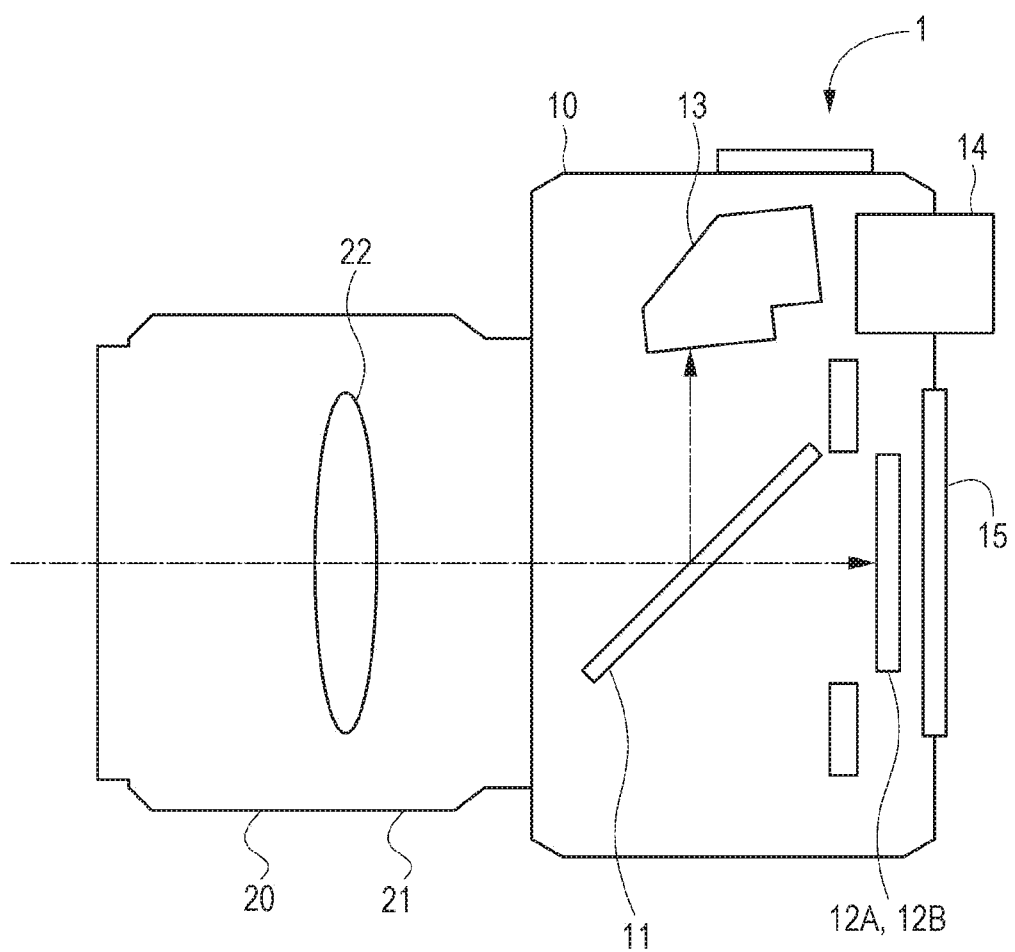
FIG. 1 is a diagram showing a schematic configuration of an imaging device according to an embodiment of the present disclosure.

First, a configuration example of an imaging device according to an embodiment of the present disclosure will be described. FIG. 1 is a schematic diagram showing a schematic configuration of an imaging device 1 according to an embodiment of the present disclosure.

The imaging device 1 includes a housing (body) 10, an optical image capturing system 20 including a shooting lens 22, a semi-transparent mirror 11, an imaging element 12A, an image surface phase difference AF sensor 12B, a dedicated phase difference AF sensor 13, an electronic view finder 14, and a display 15. For example, an imager is configured by a configuration including the imaging element 12A and the optical image capturing system 20.

As shown in FIG. 1, the optical image capturing system 20 is provided for the housing 10. The optical image capturing system 20 is, for example, a replaceable lens unit, and the shooting lens 22, a diaphragm, and the like are provided in a lens barrel 21. The shooting lens 22 is driven by a focus drive system (not shown), and is capable of an auto focus (AF) operation. In addition, the optical image capturing system 20 may be integral with the housing 10, or may be detachably attached to the housing 10 through a predetermined adapter.

The semi-transparent mirror 11 is provided in the housing 10 between the shooting lens 22 and the imaging element 12A in the housing 10. Object light enters the semi-transparent mirror 11 through the shooting lens 22. The semi-transparent mirror 11 reflects a part of the object light incident through the shooting lens 22 in a direction of the dedicated phase difference AF sensor 13 above the semi-transparent mirror 11, and also transmits a part of the object light to the imaging element 12A. Further, it is possible to arbitrarily set transmittance, reflectance, and the like of the semi-transparent mirror 11.

The imaging element 12A for generating a shooting image is provided in the housing 10. As the imaging element 12A, a charge coupled device (CCD), a complementary metal oxide semiconductor (CMOS), or the like can be used. The imaging element 12A converts the object light incident through the shooting lens 22 into a charge amount by photoelectric conversion, and generates an image. An image signal is subjected to predetermined signal processing such as white balance adjustment processing and gamma correction processing, and is finally stored, as image data, in a storage medium in the imaging device 1 or in a portable memory or the like configured to be detachable to the imaging device 1.

The imaging element 12A has an image surface phase difference AF sensor 12B for performing a phase difference focus detection as well as normal imaging pixels, for example, an R (Red) pixel, a G (Green) pixel, and a B (Blue) pixel. That is, the image surface phase difference AF sensor 12B is constituted by disposing an image surface phase difference pixel in a part of the imaging element 12A. Each pixel constituting the imaging element 12A converts the incident light from the object into a charge amount by photoelectric conversion, and outputs a pixel signal.

The dedicated phase difference AF sensor 13 is provided, for example, in the housing 10 to be positioned above the semi-transparent mirror 11 and in front of the imaging element 12A. The dedicated phase difference AF sensor 13 is, for example, an AF dedicated module of a phase difference detection method. The object light converged by the shooting lens 22 is reflected by the semi-transparent mirror 11, and enters the dedicated phase difference AF sensor 13. A focus detection signal detected by the dedicated phase difference AF sensor 13 is supplied to a processor configured to calculate a defocus amount in the imaging device 1 and the like. As described above, the imaging device 1 according to one embodiment performs AF using the dedicated phase difference AF sensor 13 and the image surface phase difference AF sensor 12B. However, the AF method performed by the imaging device 1 is not limited thereto, but may be an AF method using one of the dedicated phase difference AF sensor 13 and the image surface phase difference AF sensor 12B, or using another known AF method. The AF method performed by the imaging device 1 may be an AF method using a hybrid of a plurality of AF methods. Further, in a case where the imaging device 1 does not include the dedicated phase difference AF sensor 13, the AF is performed using the image surface phase difference AF sensor 12B.

An electronic view finder (EVF) 14 is provided in the housing 10. The electronic view finder 14 includes, for example, a liquid crystal display (LCD), an organic electroluminescence (EL) display, and the like. The electronic view finder 14 is supplied with image data obtained by processing an image signal extracted from the imaging element 12A by a signal processor (not shown). The electronic view finder 14 displays an image corresponding to the image data as a real time image (through image).

A display 15 is provided in the housing 10. The display 15 is a flat display such as a liquid crystal display, an organic EL display, or the like. The display 15 is supplied with image data obtained by processing an image signal extracted from the imaging element 12A by a signal processor (not shown), and the display 15 displays the image data as a real time image (through image). In FIG. 1, the display 15 is provided on a rear side of the housing, but is not limited thereto, and may be provided on an upper surface of the housing or the like and may be movable or removable. The display 15 may not be in the housing 10, and in this case, a television or the like connected to the imaging device 1 may function as the display 15. In addition, on the display 15, an area (hereinafter referred to as an AF area, as appropriate) in which the AF corresponding to a mode is performed is superimposed on the real time image and is displayed. Further, on the display 15, a menu screen for performing a variety of settings of the imaging device 1 as well as the real time image are displayed.

[Internal Configuration Example of Imaging Device]

Figure 2:
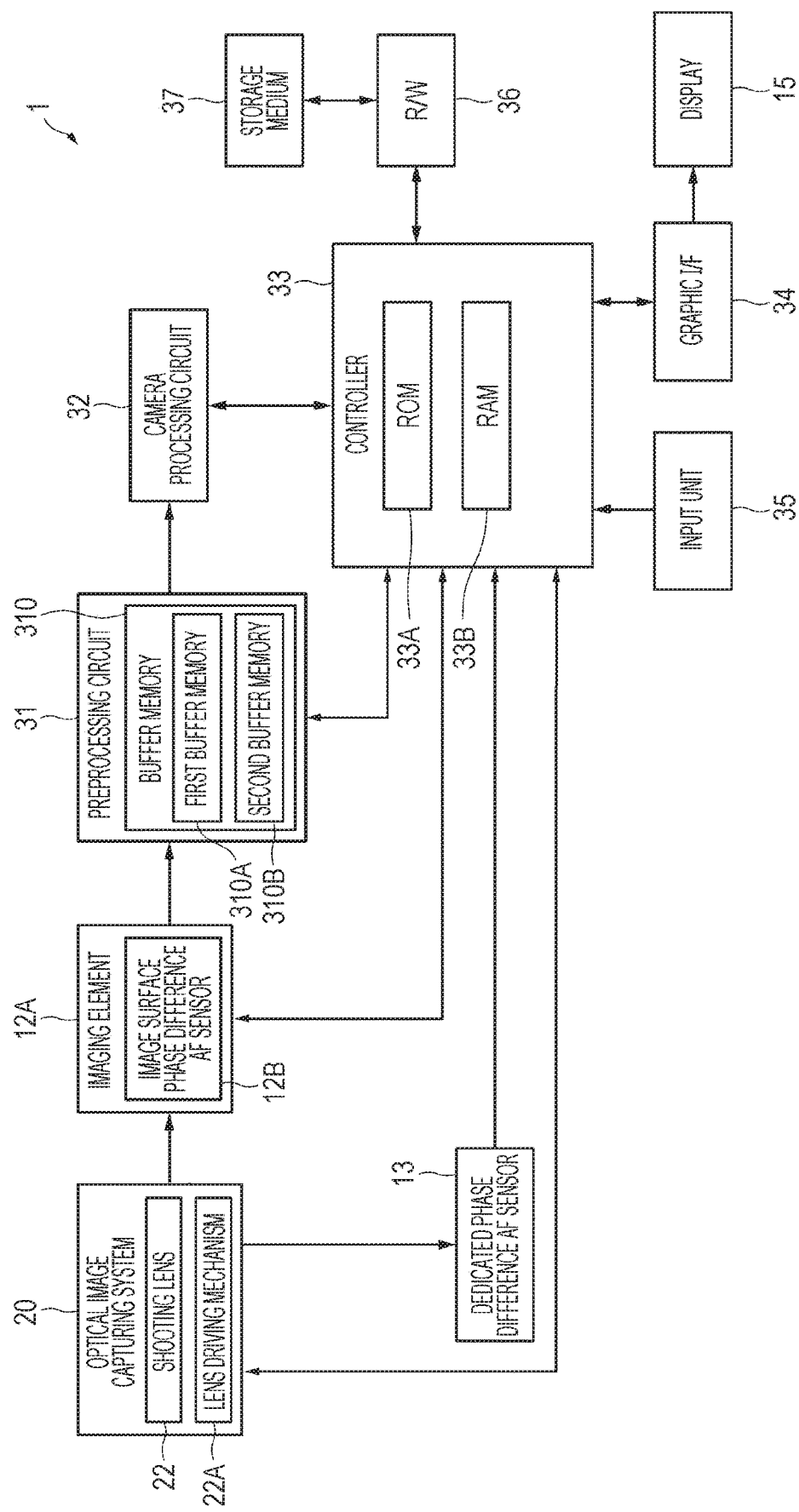
FIG. 2 is a block diagram showing a configuration example of the imaging device according to an embodiment of the present disclosure.

Next, an internal configuration example (mainly a configuration example related to signal processing) of the imaging device 1 will be described with reference to a block diagram of FIG. 2. The imaging device 1 includes, for example, a preprocessing circuit 31, a camera processing circuit 32, a controller 33, a graphic interface (I/F) 34, an input unit 35, a reader/writer (R/W) 36, and a storage medium 37, in addition to the optical image capturing system 20, the dedicated phase difference AF sensor 13, the imaging element 12A, the image surface phase difference AF sensor 12B, and the display 15 described above.

The optical image capturing system 20 includes the shooting lens 22 (including a focus lens, a zoom lens, and the like) for converging light from the object on the imaging element 12A, a lens drive mechanism 22A for performing focus adjustment by moving the focus lens, a shutter mechanism, an iris mechanism, and the like. The mechanisms are driven on the basis of a control signal from the controller 33. The lens drive mechanism 22A performs an AF operation by moving the shooting lens 22 along an optical axis direction in accordance with the control signal supplied from the controller 33. An optical image of the object obtained through the optical image capturing system 20 is formed as the image on the imaging element 12A as the imaging device.

The dedicated phase difference AF sensor 13 is, for example, an auto focus dedicated sensor of a phase difference detection method. The object light converged by the shooting lens 22 is reflected by the semi-transparent mirror 11, and enters the dedicated phase difference AF sensor 13. A focus detection signal detected by the dedicated phase difference AF sensor 13 is supplied to the controller 33.

The imaging element 12A has the normal imaging pixel and the pixel for phase difference detection, as described above. The image surface phase difference AF sensor 12B is an auto focus sensor including a plurality of pixels for phase difference detection. A focus detection signal detected by the image surface phase difference AF sensor 12B is supplied to the controller 33.

The preprocessing circuit 31 performs, for example, sampling and holding to favorably maintain a signal/noise (S/N) ratio by correlated double sampling (CDS) processing on the image signal output from the imaging element 12A. Further, the preprocessing circuit 31 controls a gain by auto gain control (AGC) processing, and outputs a digital image signal by performing analog/digital (A/D) conversion.

The preprocessing circuit 31 has a buffer memory 310 in which the digital image signal after A/D conversion is temporarily stored. The buffer memory 310 is configured by, for example, dynamic random access memory (DRAM). In the present embodiment, the buffer memory 310 is configured by two buffer memories (a first buffer memory 310A and a second buffer memory 310B). For example, the capacity of the first buffer memory 310A is set to be smaller than the capacity of the second buffer memory 310B. After the digital image signal after the A/D conversion is temporarily stored in the first buffer memory 310A, the digital image signal output from the first buffer memory 310A is temporarily stored in the second buffer memory 310B. Further, the imaging element 12A, a circuit unit of the preprocessing circuit 31, and the buffer memory 310 of the preprocessing circuit 31 may be each provided in different layers of the image sensor having a plurality of layers.

The camera processing circuit 32 performs signal processing such as white balance adjustment processing, color correction processing, gamma correction processing, Y/C conversion processing, auto exposure (AE) processing, or the like, on the image signal supplied from the preprocessing circuit 31.

The controller 33 is configured by, for example, a central processing unit (CPU), and has a read only memory (ROM) 33A and a random access memory (RAM) 33B. The ROM 33A stores programs and the like that are read and executed by the CPU. The RAM 33B is used as a work memory of the CPU. The CPU executes various processes according to the programs stored in the ROM 33A and issues commands to control the entire imaging device 1.

Further, although the preprocessing circuit 31 includes the buffer memory 310 as an example hereinabove, the buffer memory 310 may not necessarily be provided in the preprocessing circuit 31. In addition, the first buffer memory 310A and the second buffer memory 310B may be included in different components. For example, the first buffer memory 310A may be configured as one imaging element unit together with the imaging element 12A, and the second buffer memory 310B may be included in the controller 33.

The graphic I/F 34 generates an image signal to be displayed on the display 15 from the image signal supplied from the controller 33 and displays the image by supplying the image signal to the display 15. The display 15 displays a through image during imaging, an image recorded in the storage medium 37, a menu screen for performing various settings of the imaging device 1, and the like.

The input unit 35 includes, for example, a power button for power on/off switching, a release button for instructing the start of recording of an imaging image, an operator for zoom adjustment, and a touch screen integrated with the display 15, and the like. When an input is made to the input unit 35, a control signal corresponding to the input is generated and output to the controller 33. In addition, the controller 33 performs operation processing or control corresponding to the control signal.

The R/W 36 is an interface to which a storage medium 37 for recording image data and the like generated by the imaging is connected. The R/W 36 writes the data supplied from the controller 33 to the storage medium 37, and outputs the data read from the storage medium 37 to the controller 33. The storage medium 37 is, for example, a large-capacity storage medium such as a hard disk, a memory stick (registered trademark of Sony Corporation), and an SD memory card. The image is stored in a compressed state on the basis of, for example, standards such as JPEG and the like. In addition, exchangeable image file format (EXIF) data, which includes information regarding the stored image and additional information such as the date and time of the imaging, is also stored in the corresponding image.

[Basic Operation Example of Imaging Device]

Here, a basic operation of the imaging device 1 described above will be described. Before the imaging of the image, signals received by the imaging element 12A and subjected to photoelectric conversion are successively supplied to the preprocessing circuit 31. In the preprocessing circuit 31, the input signal is subjected to CDS processing, AGC processing, and the like, and further converted into the image signal.

The camera processing circuit 32 performs image quality correction processing on the image signal supplied from the preprocessing circuit 31, and supplies the image signal to the graphic I/F 34 through the controller 33 as a signal of the through image. With this arrangement, the through image is displayed on the display 15. The user can view the through image displayed on the display 15 and perform adjustment of an angle of view.

In this state, when the shutter button of the input unit 35 is pushed down, the controller 33 outputs a control signal to the optical image capturing system 20 to operate the shutter constituting the optical image capturing system 20. With this arrangement, an image signal of one frame is output from the imaging element 12A.

The camera processing circuit 32 performs image quality correction processing on the image signal of one frame supplied from the imaging element 12A through the preprocessing circuit 31 and supplies the processed image signal to the controller 33. The controller 33 compresses and encodes the input image signal, and supplies the generated encoded data to the R/W 36. With this arrangement, a data file of an imaged still image is stored in the storage medium 37 through the R/W 36. Further, in moving image shooting, the processing described above is performed in real time according to an instruction of moving image shooting. It is also possible to shoot the still image at the time of moving image shooting by pushing down the shutter button at the time of moving image shooting.

On the other hand, in a case where the image file stored in the storage medium 37 is to be reproduced, the controller 33 reads a selected still image file from the storage medium 37 through the R/W 36 in accordance with the operation input from the input unit 35. Extension and decoding processing is performed on the read image file. In addition, the decoded image signal is supplied to the graphic I/F 34 through the controller 33. With this arrangement, the still image stored in the storage medium 37 is displayed on the display 15.

Problems to be Considered in Imaging Device

The imaging device 1 according to the present embodiment is capable of setting a continuous shooting mode in which shooting is performed continuously in time as a shooting mode. Problems to be considered in a case where the imaging device 1 operates in the continuous shooting mode will be described with reference to FIGS. 3 to 9. Further, in FIGS. 3 to 9, the imaging element 12A, the first buffer memory 310A, the second buffer memory 310B, and the storage medium 37 are schematically shown.

Figure 3:
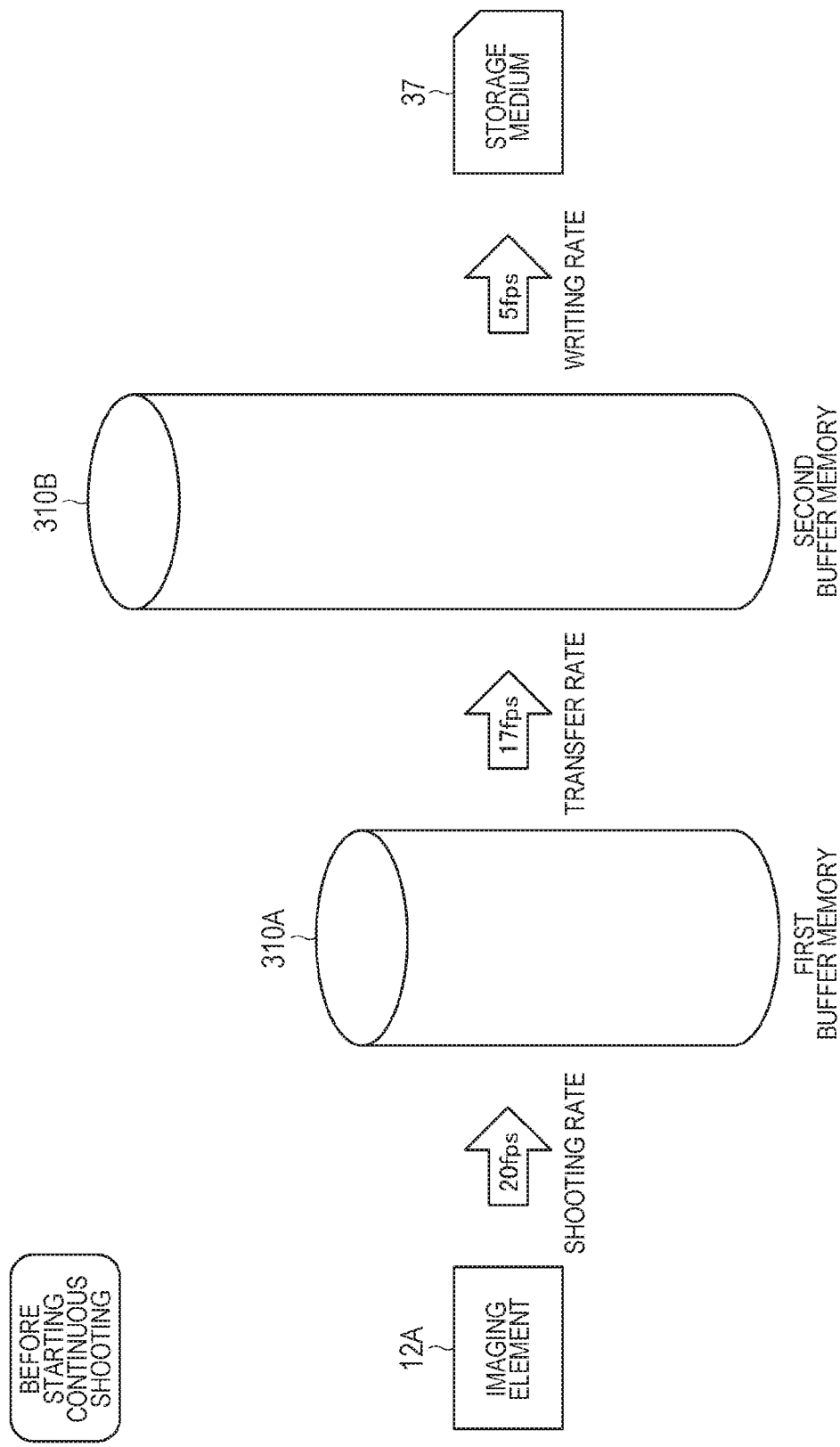
FIG. 3 is a schematic diagram showing a shooting rate, a transfer rate, a writing rate, a free space of a buffer memory, and the like in an embodiment of the present disclosure.

FIG. 3 shows a state before the continuous shooting is performed by the imaging device 1. In this state, the first and second buffer memories 310A and 310B are empty (images are not stored). In the present embodiment, a description is made by setting a shooting rate at the time of continuous shooting of the imaging device 1 to 20 frame per second (fps), setting a transfer speed of the image signal from the first buffer memory 310A to the second buffer memory 310B (hereinafter referred to as a transfer rate as appropriate) to 17 fps, and setting a speed at which the image read from the second buffer memory 310B is subjected to signal processing and written into the storage medium 37 by the R/W 36 (hereinafter referred to as a writing rate as appropriate) to 5 fps. Further, the shooting rate at the time of continuous shooting is, for example, the fastest shooting rate (operating rate) in the shooting rate of the possible continuous shooting of the imaging device 1. The shooting rate does not change, for example, at the time of the same continuous shooting, but can be set to high or low using a menu screen or the like in the case of a different continuous shooting opportunity.

Figure 4:
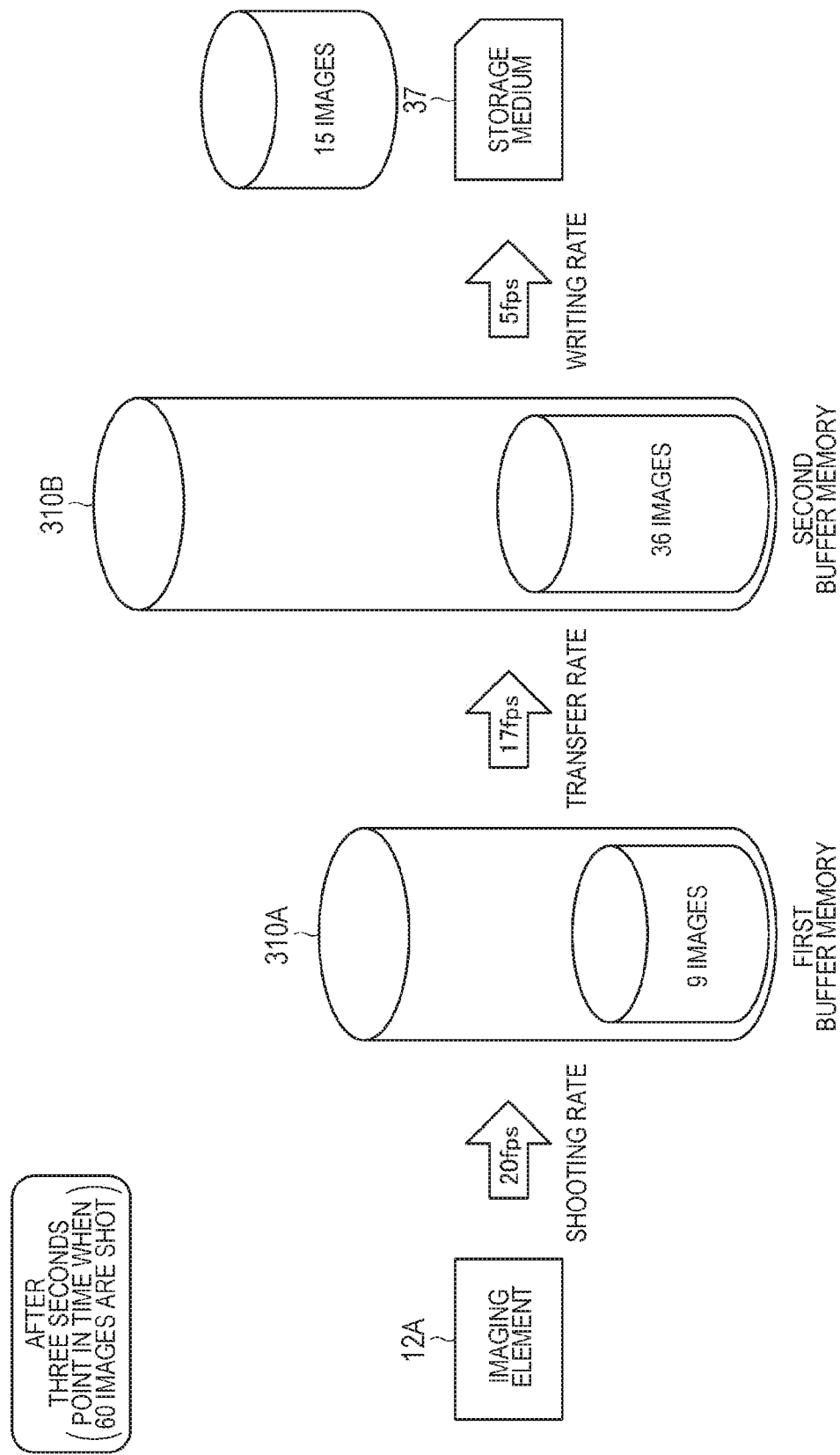
FIG. 4 is a schematic diagram showing a shooting rate, a transfer rate, a writing rate, free spaces of buffer memories, and the like after a predetermined time elapses.
Figure 5:
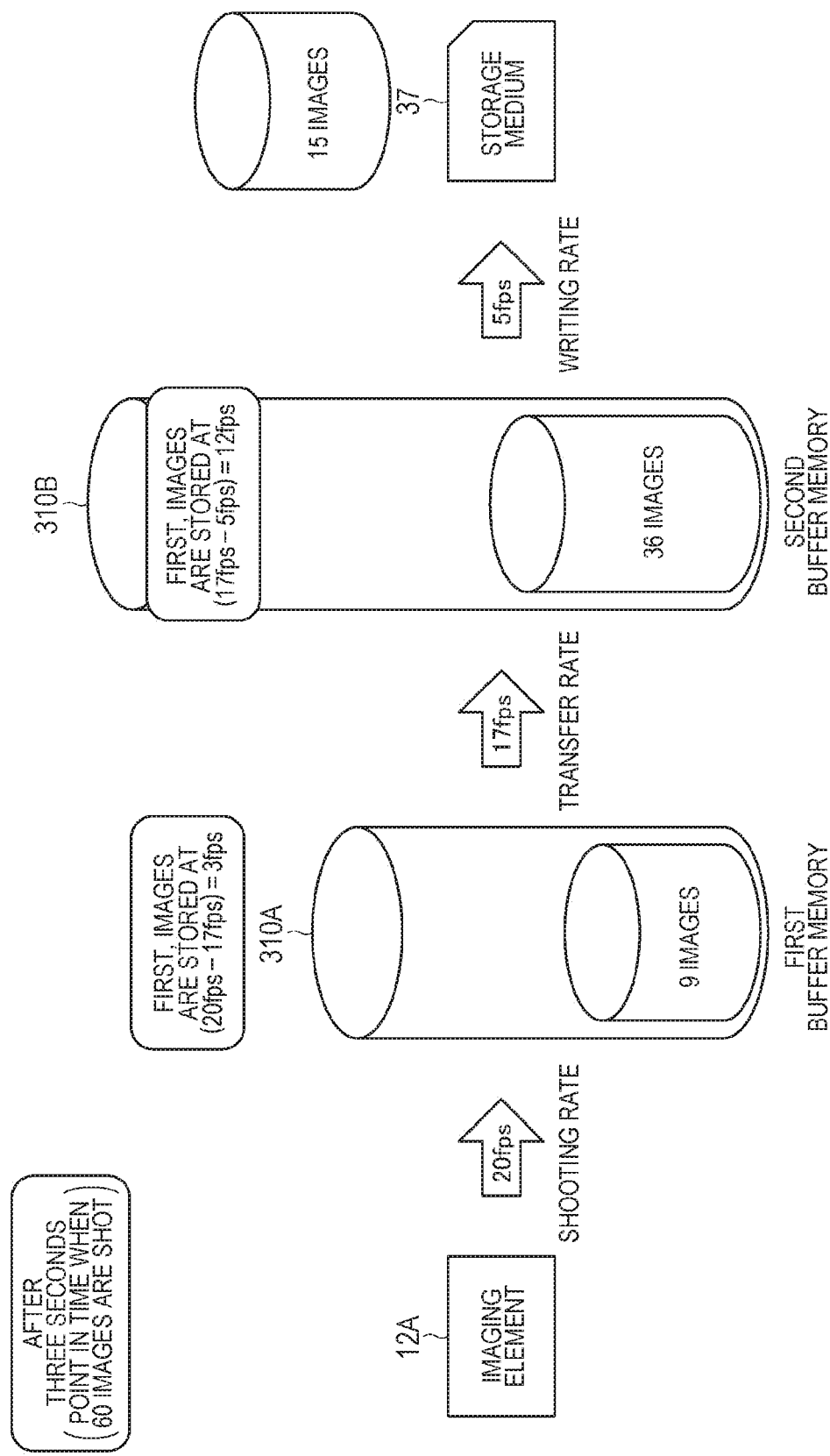
FIG. 5 is a schematic diagram showing a shooting rate, a transfer rate, a writing rate, free spaces of buffer memories, and the like after a predetermined time elapses.

FIGS. 4 and 5 show states after 3 seconds from the start of the continuous shooting (60 images in 20×3 as the number of shot images). In the first buffer memory 310A, the image is stored at 3 fps, which is a difference between the shooting rate and the transfer rate ((20−17) fps). Thus, after 3 seconds, 9 images are stored (accumulated) in the first buffer memory 310A. In the second buffer memory 310B, the image is stored at 12 fps, which is a difference between the shooting rate and the transfer rate ((17−5) fps). Thus, after 3 seconds, 36 images are stored in the second buffer memory 310B. Since the image is stored at 5 fps in the storage medium 37, 15 images are stored in the storage medium 37 after 3 seconds.

Figure 6:
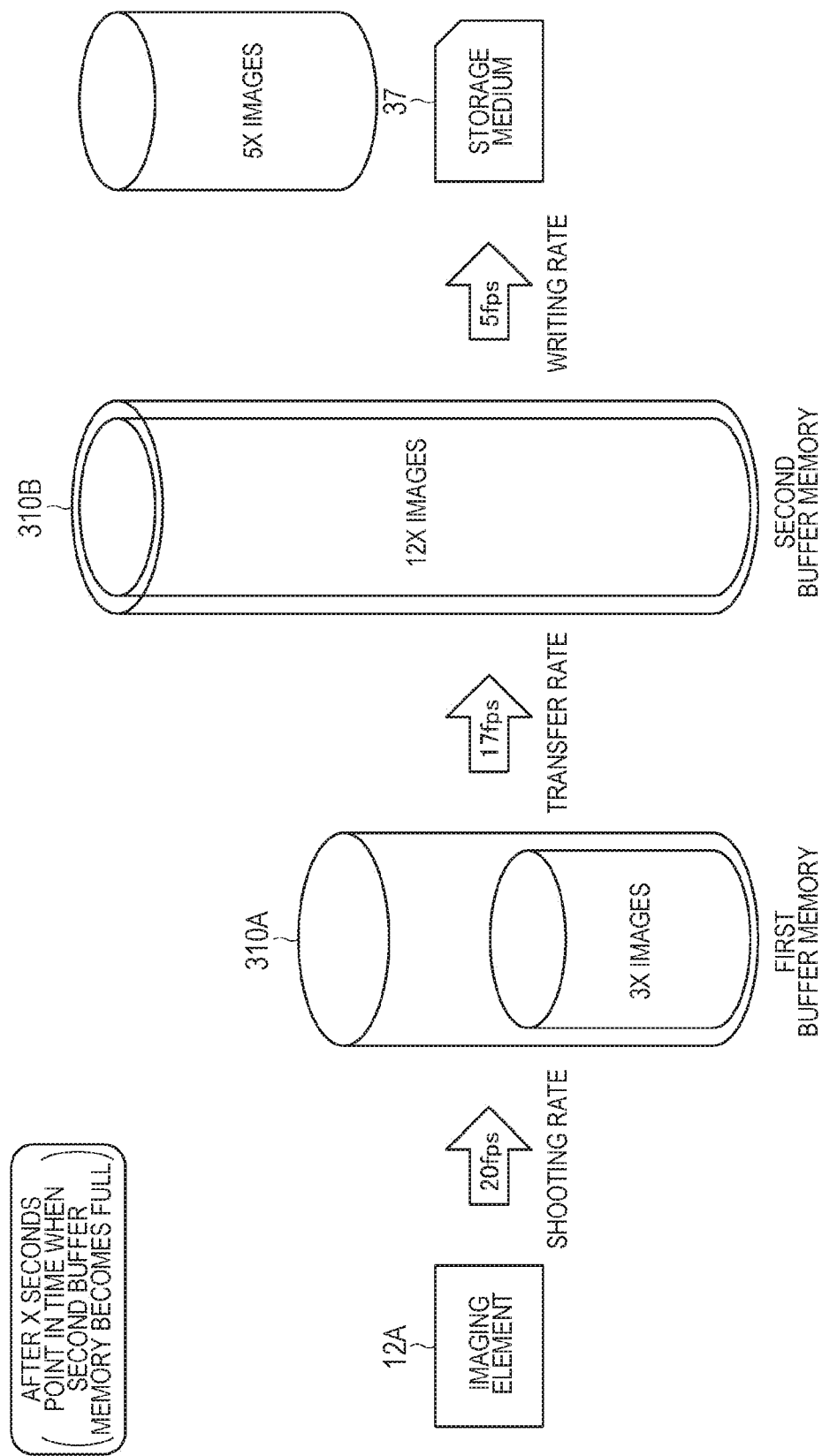
FIG. 6 is a schematic diagram showing a state where a second buffer memory becomes full.

FIG. 6 shows a state in which the second buffer memory 310B has no free space and becomes full after X seconds. After X seconds, 3X (3×X) images are stored in the first buffer memory 310A. 12X (12×X) images are stored in the second buffer memory 310B. 5X (5×X) images are stored in the storage medium 37.

Figure 7:
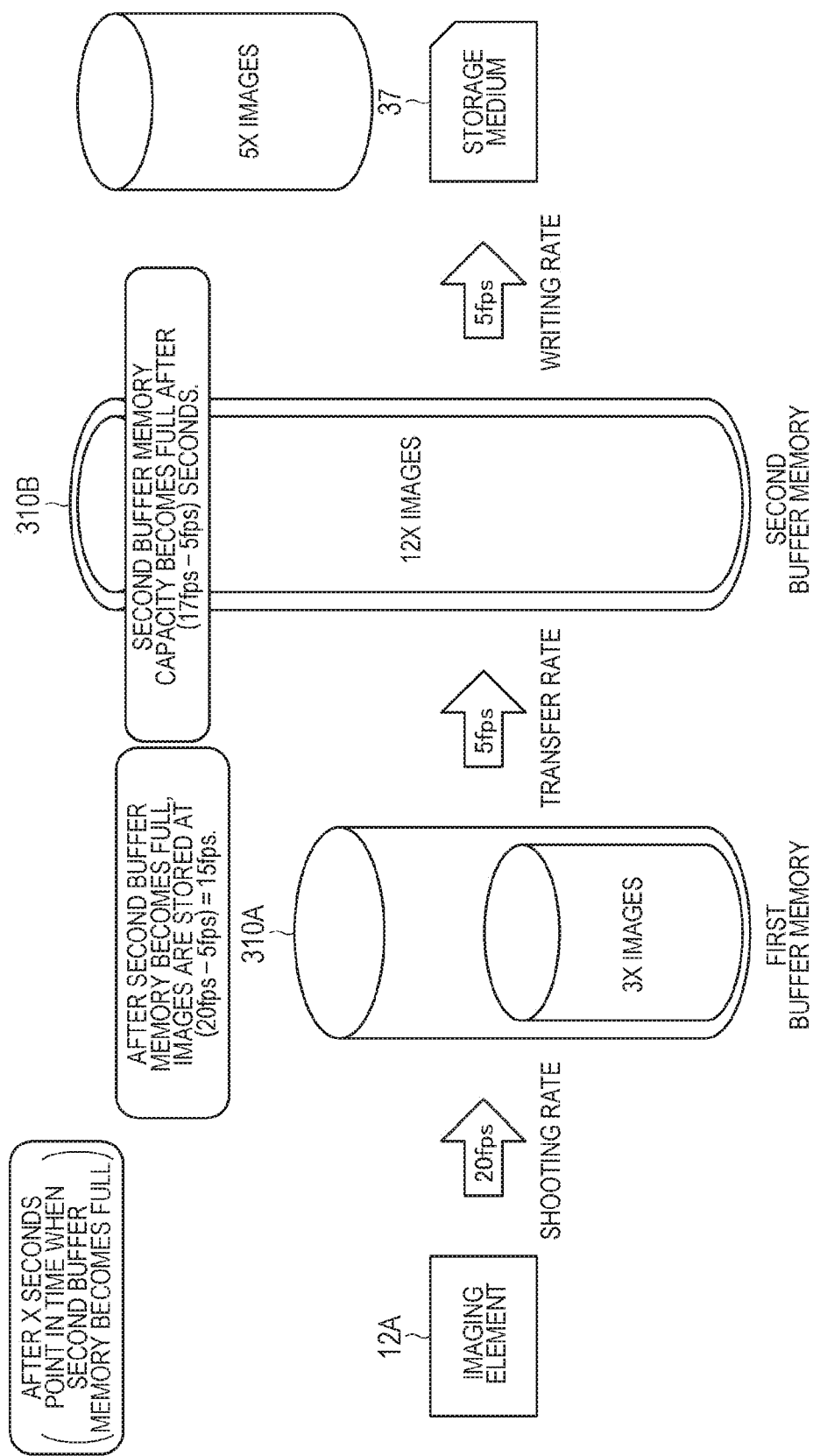
FIG. 7 is a schematic diagram showing a state where a second buffer memory becomes full.

As shown in FIG. 7, a value of X can be calculated by (the buffer amount (capacity) of the second buffer memory/12 fps). Since the image is output from the second buffer memory 310B only at 5 fps after the second buffer memory 310B becomes full, an input of the image that the second buffer memory 310B receives is 5 fps. That is, the transfer rate is 5 fps. Therefore, after the second buffer memory 310B becomes full, the image is stored in the first buffer memory 310A at 15 fps ((20−5) fps).

Figure 8:
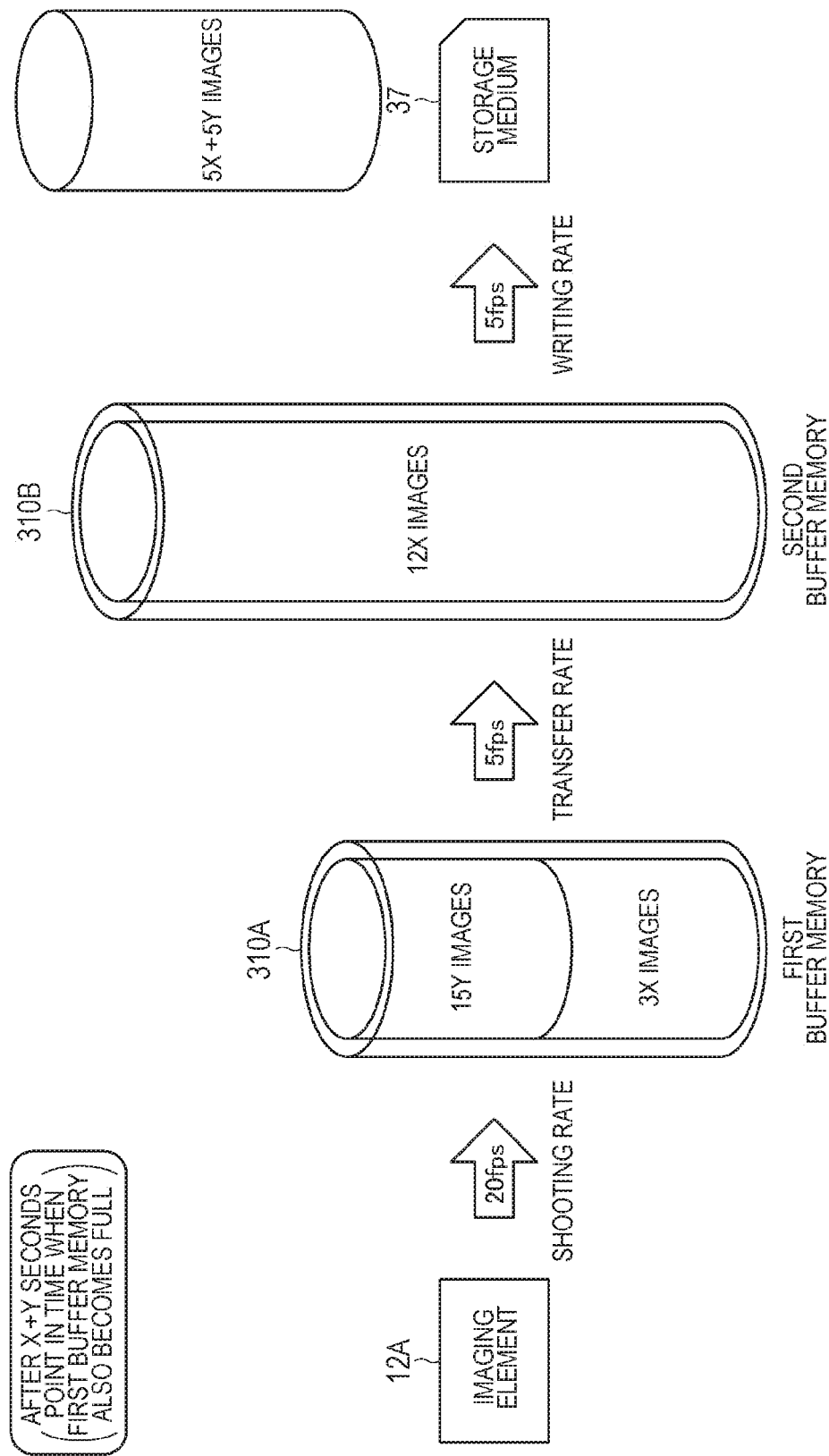
FIG. 8 is a schematic diagram showing a state where a first buffer memory becomes full.
Figure 9:
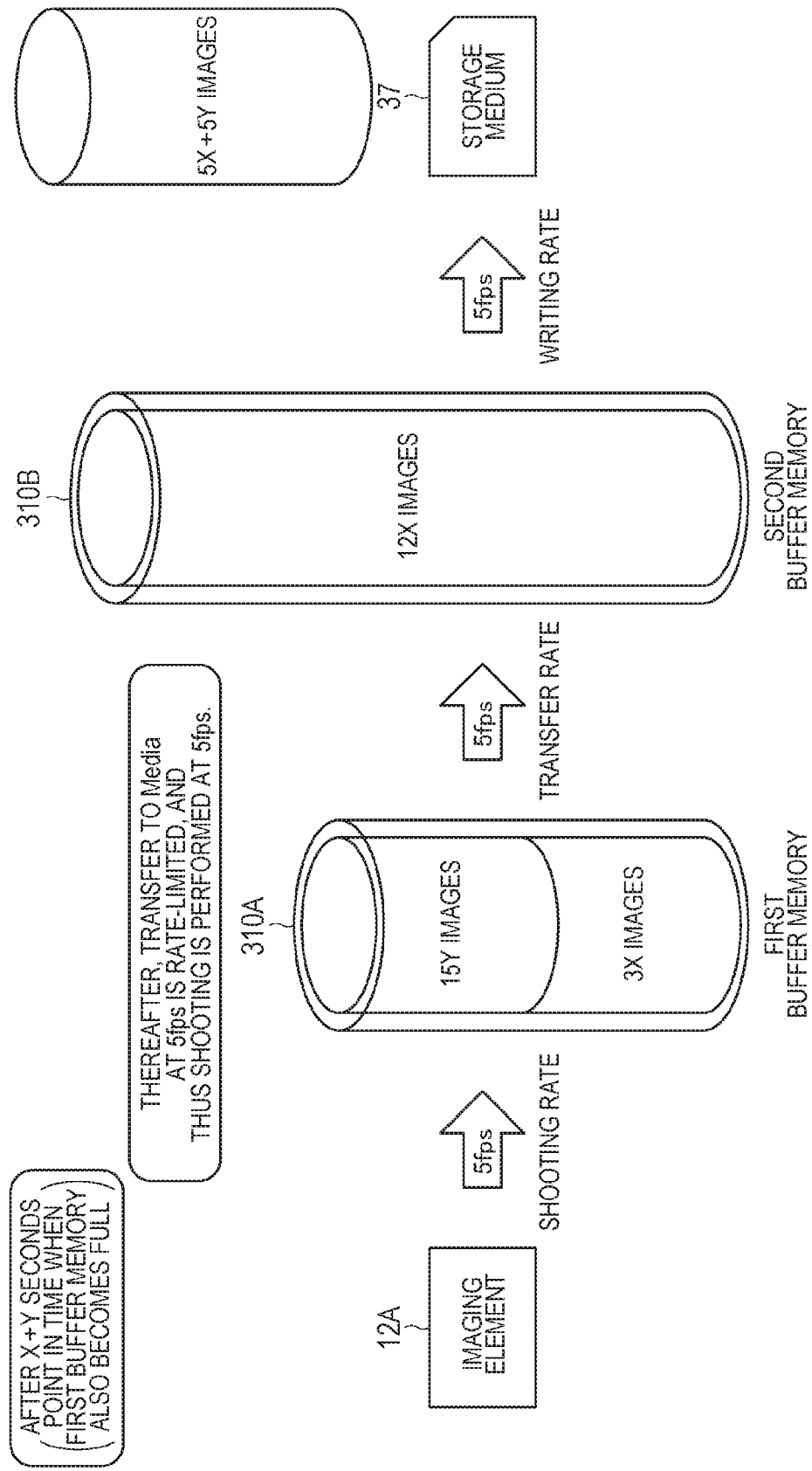
FIG. 9 is a schematic diagram showing a state where a first buffer memory becomes full and a shooting rate decreases.

FIGS. 8 and 9 show states after (X+Y) seconds when the first buffer memory 310A becomes full. After (X+Y) seconds, (3X+15Y) images are stored in the first buffer memory 310A. Thereafter, the shooting at 5 fps, which is the writing rate to the storage medium 37, is performed. That is, at the point of time when the first buffer memory 310A becomes full, since the system is rate-limited (because of a bottleneck), the shooting rate of the continuous shooting cannot be maintained and the shooting rate will drop from 20 fps to 5 fps. Further, the shooting rate is lowered, but it is not possible to perform the continuous shooting itself.

Figure 10:
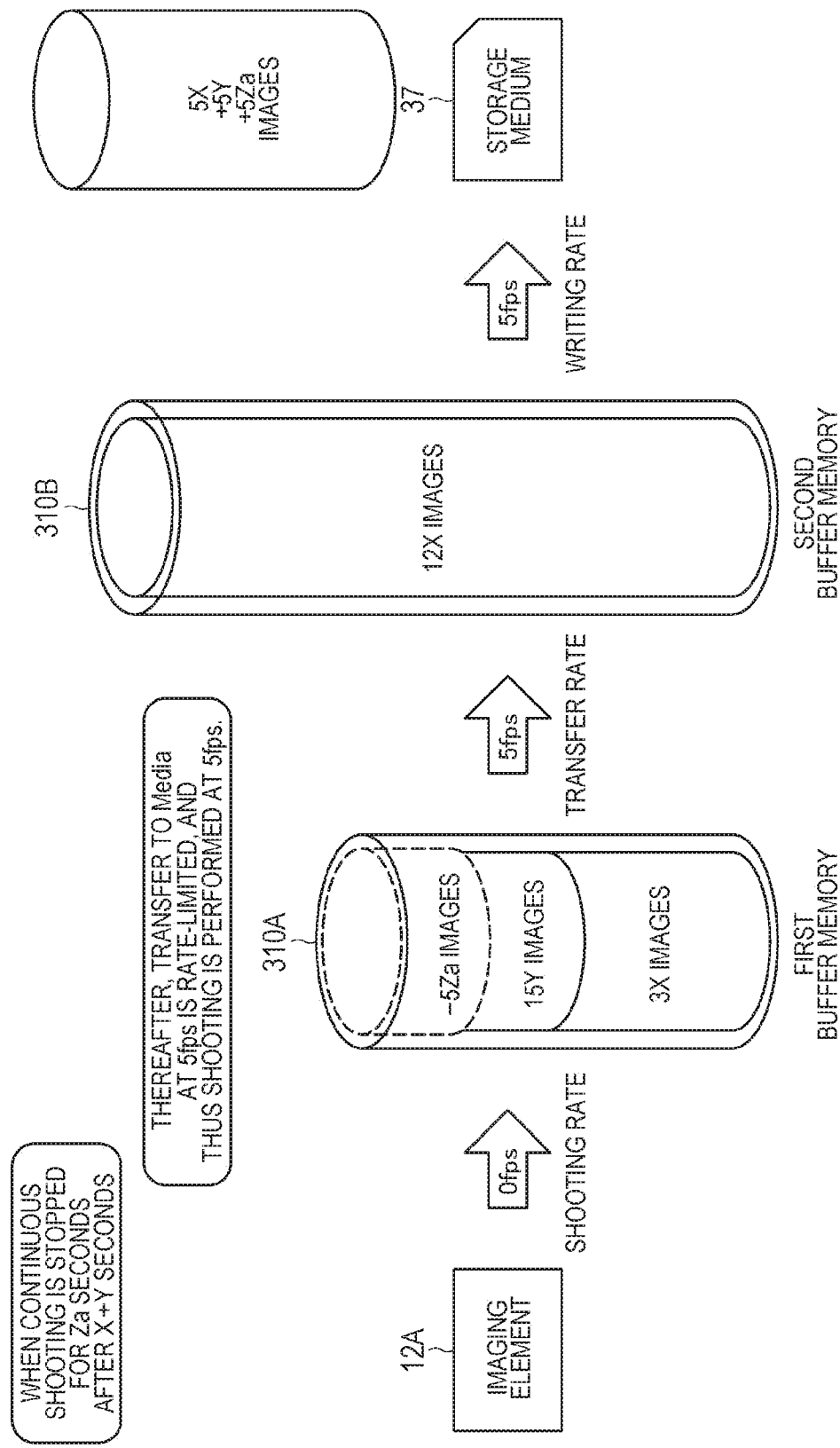
FIG. 10 is a schematic diagram showing a state after continuous shooting is stopped for a predetermined time.
Figure 11:
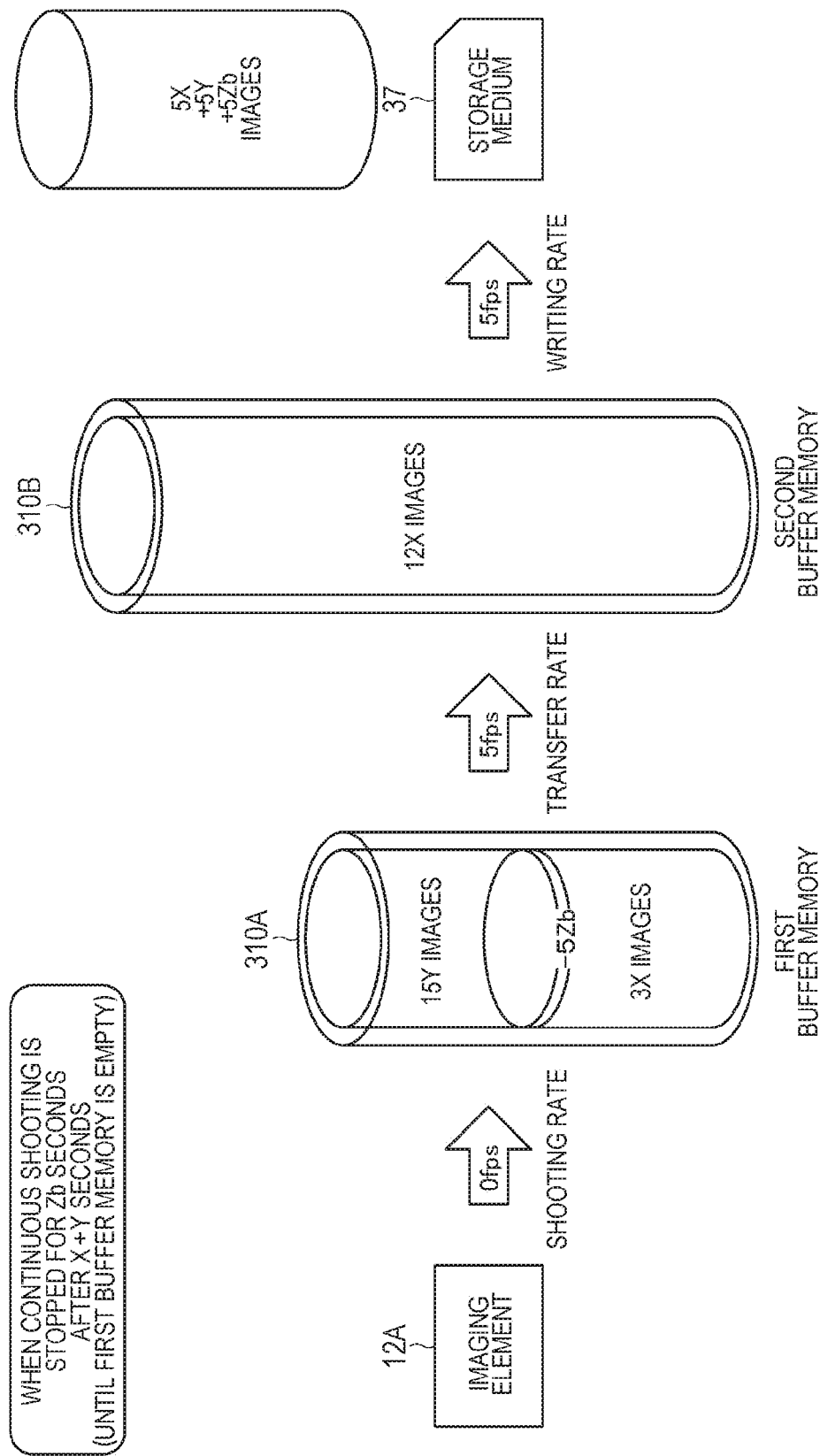
FIG. 11 is a schematic diagram showing a state after continuous shooting is stopped until a first buffer memory is empty.

The user is aware that the shooting rate at the time of the continuous shooting is lowered due to changes in the shutter sound and the like. In this case, the user temporarily stops the continuous shooting to restore the free space of the first buffer memory 310A. FIG. 10 shows a state in which the user stops the continuous shooting for Za seconds after (X+Y) seconds. While the continuous shooting is stopped, the number of images corresponding to the writing rate, that is, 5Za images, the free space of the first buffer memory 310A is restored. Further, in a case where the free space of the first buffer memory 310A is restored, a symbol of − (minus) is attached to the number of images and the number of images is indicated as −5Za in FIG. 10. FIG. 11 shows a state in which continuous shooting is stopped for Zb seconds after (X+Y) seconds until the first buffer memory 310A is empty. That is, FIG. 11 shows a state in which the number of images corresponding to −5Zb and the number of images corresponding to (3X+15Y) are equal to each other. For example, from the state shown in FIG. 11, the continuous shooting at a shooting rate of the imaging device 1 (20 fps in the present example) is possible.

Here, in a case where the relationship of the shooting rate>the transfer rate is established, the time from when the continuous shooting starts until the shooting rate cannot be maintained (the shooting rate is lowered) is set to T.

In addition, if the time until the second buffer memory 310B becomes full is set to T1, T1 can be expressed by [the remaining capacity of the second buffer memory 310B (capacity corresponding to the number of images)]/([transfer rate]−[writing rate]).

In addition, if the time until the first buffer memory 310A becomes full is set to T2, T2 can be expressed by [the remaining capacity of the first buffer memory 310A (capacity corresponding to the number of images)]/([shooting rate]−[transfer rate]).

Here, in a case where T1≤T2, T=T2 is established.

In addition, if the time until the first buffer memory 310A becomes full after T1 elapses is set to T3, T3 can be expressed by [the remaining capacity of the first buffer memory 310A]−([shooting rate]−[transfer rate])*T1)/([shooting rate]−[writing rate]). Here, in a case where T1<T2, then T=T1+T3 is established.

In a case where the transfer rate>shooting rate>writing rate is established, the shooting rate is lowered after the first and second buffer memories 310A and 310B become full. In addition, in a case in which the writing rate the shooting rate, the continuous shooting can be performed while maintaining the shooting rate until the storage medium 38 becomes full.

As described above, if the continuous shooting is continued, it may become impossible to maintain the shooting rate after a certain period of time. The user who has recognized the decrease in the shooting rate due to the change in shutter sound can recover the capacity of the buffer memory by stopping the continuous shooting, and then makes it possible to perform the continuous shooting again. However, in a case where a decisive scene is generated while stopping the continuous shooting, for example, there is a possibility that the opportunity to shoot is lost. Therefore, in an embodiment of the present disclosure, whether or not shooting is performed at a shooting rate slower than a predetermined shooting rate, after the shooting starts is displayed on a display, thereby making it possible to enable the user to appropriately start and stop the continuous shooting and to prevent the loss of the opportunity to shoot from being generated. Of course, the shooting rate or the like described above is merely an example, and may be different values depending on shutter speed, a diaphragm value, the standard of the storage medium 37, the degree of compression of the image, or the like, but it is necessary to consider the problems described above in any case. One embodiment that has been taken into consideration in the above points will be described in more detail.

[Display Example of Bar]

Figure 12:
FIG. 12 is a diagram for describing a display example of a bar.

In an embodiment of the present disclosure, a bar-shaped bar displays whether or not shooting is performed at a shooting rate slower than a predetermined shooting rate after the continuous shooting starts at the predetermined shooting rate (e.g., the fastest shooting rate). FIG. 12 is a view for describing an example (bar BA) of a bar displayed on the display 15. On the display 15, objects such as sky including clouds, grasses, and the like are displayed. On an upper side of the display 15, shooting information 41 including the remaining capacity of a battery, a setting state regarding a shooting quality, and the like is displayed along the left and right directions. On a lower side of the display 15, shooting information 42 including a shutter speed, a F value, and international organization for standardization (ISO) sensitivity, and the like is displayed along the left and right direction.

For example, a white bar BA extending in a vertical direction is displayed at the left end of the area where the object is photographed. The bar BA is displayed, for example, by a thin line so as not to hide the object as much as possible. A length of the bar BA is variable in the vertical direction. The bar BA may be displayed to be white or colored.

"SLOW" is displayed on a lower end portion of the bar BA. If the length of the bar BA becomes zero, i.e., the bar BA is shortened to "SLOW", the shooting rate is slower than the shooting rate for continuous shooting (20 fps in the example described above). That is, in a case where the bar BA is displayed, the continuous shooting on the basis of 20 fps in the example described above is performed, and if the bar BA is shortened and is not displayed, the continuous shooting on the basis of a shooting rate (e.g., 5 fps) slower than 20 fps is performed.

The display of the bar BA on the display 15 is performed by the graphic I/F 34 in accordance with the control by the controller 33. The change in display of the bar BA corresponds, for example, to the free space of the first buffer memory 310A. Specifically, the controller 33 calculates the number of images or time that can be shot continuously on the basis of a predetermined shooting rate in accordance with the free space of the first buffer memory 310A by an operation, and changes the length of the bar BA in accordance with the operation result. For example, when the free space of the first buffer memory 310A becomes smaller, the number of images or time that can be shot continuously with the shooting rate being maintained becomes smaller, and the controller 33 thus instructs the graphic I/F 34 to shorten the length of the bar BA. On the contrary to this, when the continuous shooting is stopped and the free space of the first buffer memory 310A is restored (becomes larger), the number of images or time that can be shot continuously with the shooting rate being maintained becomes larger, and the controller 33 thus instructs the graphic I/F 34 to increase the length of the bar BA. With this arrangement, the length of the bar BA extends or retracts.

If the free space of the first buffer memory 310A disappears, the shooting rate will be slow, and the length of the bar BA is thus shortened to the lower end portion near the display of SLOW and becomes 0. The fact that the length of the bar BA is 0 is equivalent to displaying only SLOW without displaying the bar BA. In a case where the length of the bar BA becomes 0, a display mode may be changed by blinking SLOW or the like. Thus, the length of the bar BA changes within a predetermined range, for example, with the lower end portion as a base point. The end portion is a display point corresponding to the shooting rate that is slower than the shooting rate of the continuous shooting.

The BA is displayed on the display 15, for example, after the start of the continuous shooting. With this arrangement, since the user can know the timing until the shooting rate slows down, in other words, until the shooting rate at the time of the start of continuous shooting cannot be maintained, the user can stop the continuous shooting and restore the capacity of the first buffer memory 310A, if not necessary. With this arrangement, it is possible to prevent as much as possible a situation where the continuous shooting cannot be performed at a predetermined shooting rate in an important scene from occurring.

[Settings Regarding Display of Bar]

Figure 13A:
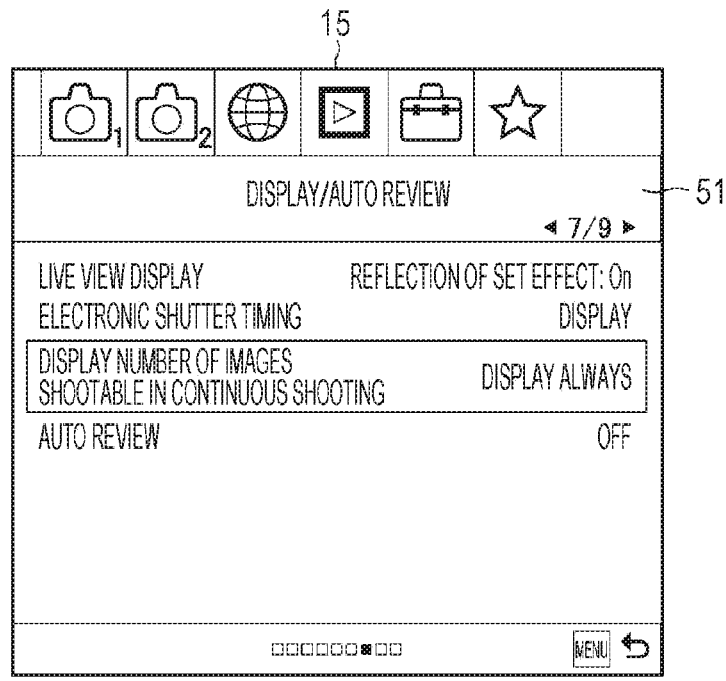
FIGS. 13A and 13B are diagrams for describing an example of a screen for performing a setting regarding a display of a bar.
Figure 13B:
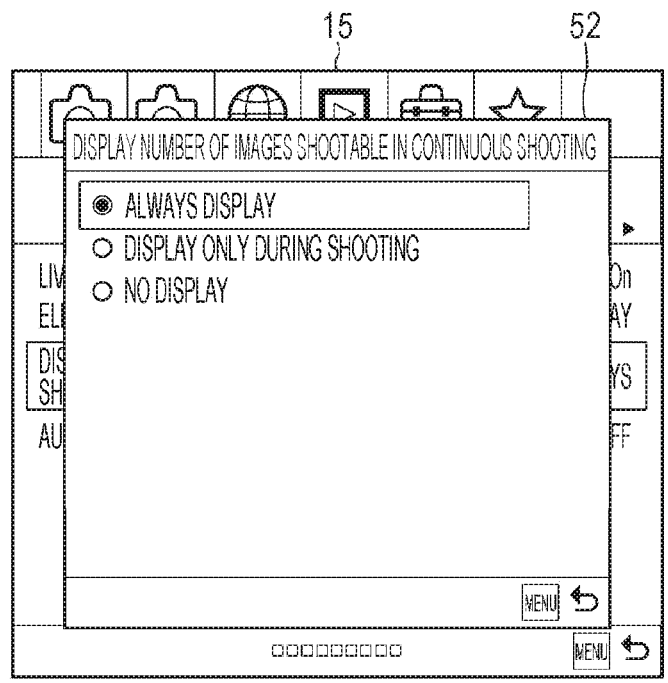

In the present embodiment, it is possible to perform settings regarding a display of the bar BA. FIGS. 13A and 13B show screen examples for performing the settings regarding the display of the bar BA. FIG. 13A is a screen 51, for example, for performing a setting regarding the display or the like of a menu screen displayed on the display 15. If the user selects "display number of images shootable in continuous shooting" corresponding to the display of the bar BA among selectable items displayed on the screen 51, the screen 51 is transitioned to a screen shown in FIG. 13B. If "display number of images shootable in continuous shooting" is selected, a pop-up screen 52 for performing a setting regarding "display number of images shootable in continuous shooting" is displayed on the display 15.

Three patterns are displayed on the pop-up screen 52, and one of the patterns can be set. The three display patterns are the "always display", "display only during shooting", and "no display" patterns. If "always display" is selected, the bar BA is always displayed on the display 15. If "display only during shooting" is selected, the bar BA is displayed on the display 15 only when the continuous shooting is performed. If "no display" is selected, the bar BA is not displayed, including when the continuous shooting is performed. In this way, it is possible to perform the settings regarding the display of the bar BA.

[Flow of Processing]

Figure 14:
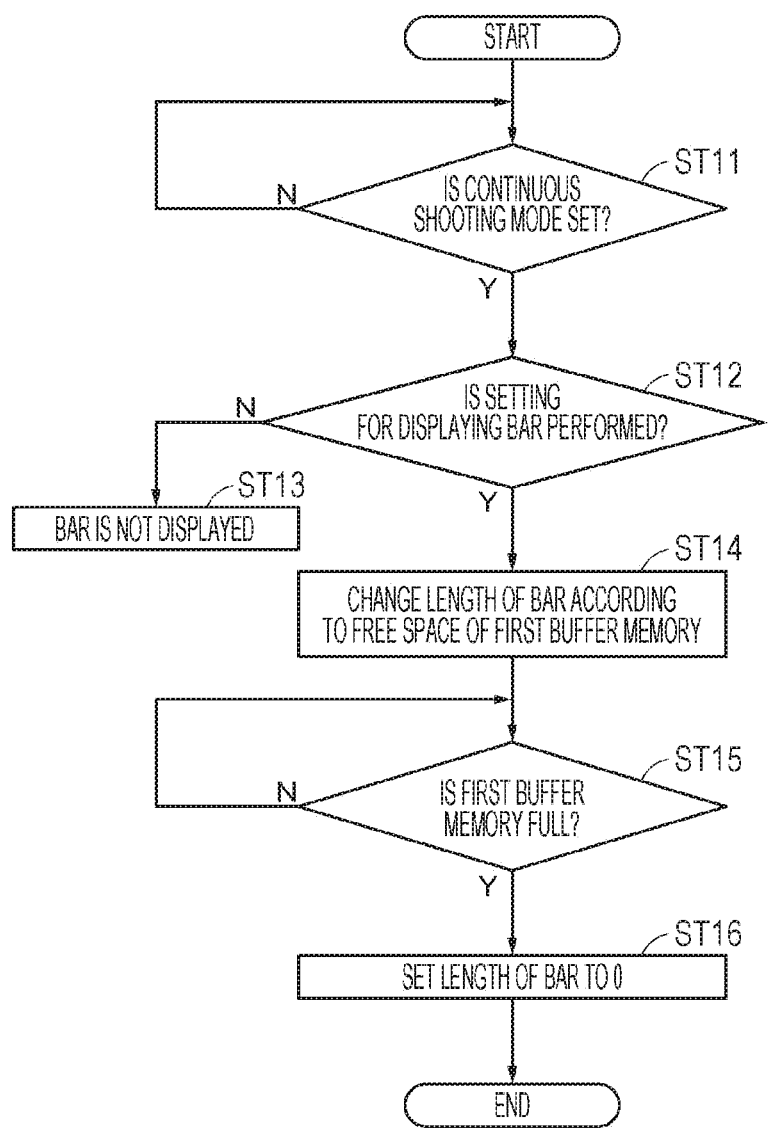
FIG. 14 is a flowchart showing a flow of processing performed in an imaging device according to an embodiment of the present disclosure.

FIG. 14 is a flowchart showing a flow of processing of a display control of the BA performed in the imaging device 1. Unless otherwise specified, the processing described below is performed by the graphic I/F 34 in accordance with the control of the controller 33. In addition, the shooting rate, transfer rate, and writing rate will be described using the rate described with reference to FIG. 3 as an example.

In step ST11, it is determined whether or not a shooting mode set in the imaging device 1 is a continuous shooting mode. If the imaging mode set in the imaging device 1 is not the continuous shooting mode, the processing returns to step ST11, and the processing in step ST11 is repeated. If the shooting mode set in the imaging device 1 is the continuous shooting mode, the continuous shooting starts, and the processing then proceeds to step ST12.

In step ST12, it is determined whether or not the setting of displaying the bar BA is performed. Here, for example, if "no display" of the setting examples described above is set, the processing proceeds to step ST13. In step ST13, control that does not display the bar BA is performed. In addition, in a case where "always display" or "display only during shooting" of the setting examples described above is set, the processing proceeds to step ST14.

In step ST14, the controller 33 calculates the number of images or time that can be shot continuously on the basis of a predetermined shooting rate (in the present example, 20 fps) in accordance with the free space of the first buffer memory 310A by an operation, and appropriately changes the length of the bar BA in accordance with the operation result. In addition, the processing proceeds to step ST15.

In step ST15, it is determined whether or not the first buffer memory 310A is full (free space is 0). In a case where the first buffer memory 310A is not full, the processing returns to step ST15, and the processing of step ST15 is repeated. In a case where the first buffer memory 310A is full, the processing proceeds to step ST16.

In step ST16, since the first buffer memory 310A is full and the shooting rate is slow, control is performed to set the length of the bar BA to zero. In addition, the processing ends. Further, although not shown in FIG. 14, if the continuous shooting is stopped, the free space of the first buffer memory 310A increases, and control is performed to increase the length of the bar BA.

2. Modified Example

Hereinabove, although an embodiment of the present disclosure has been described in detail, the contents of the present disclosure are not limited to the above-described one embodiment, and various modifications on the basis of the technical concept of the present disclosure are possible.

Figure 15:
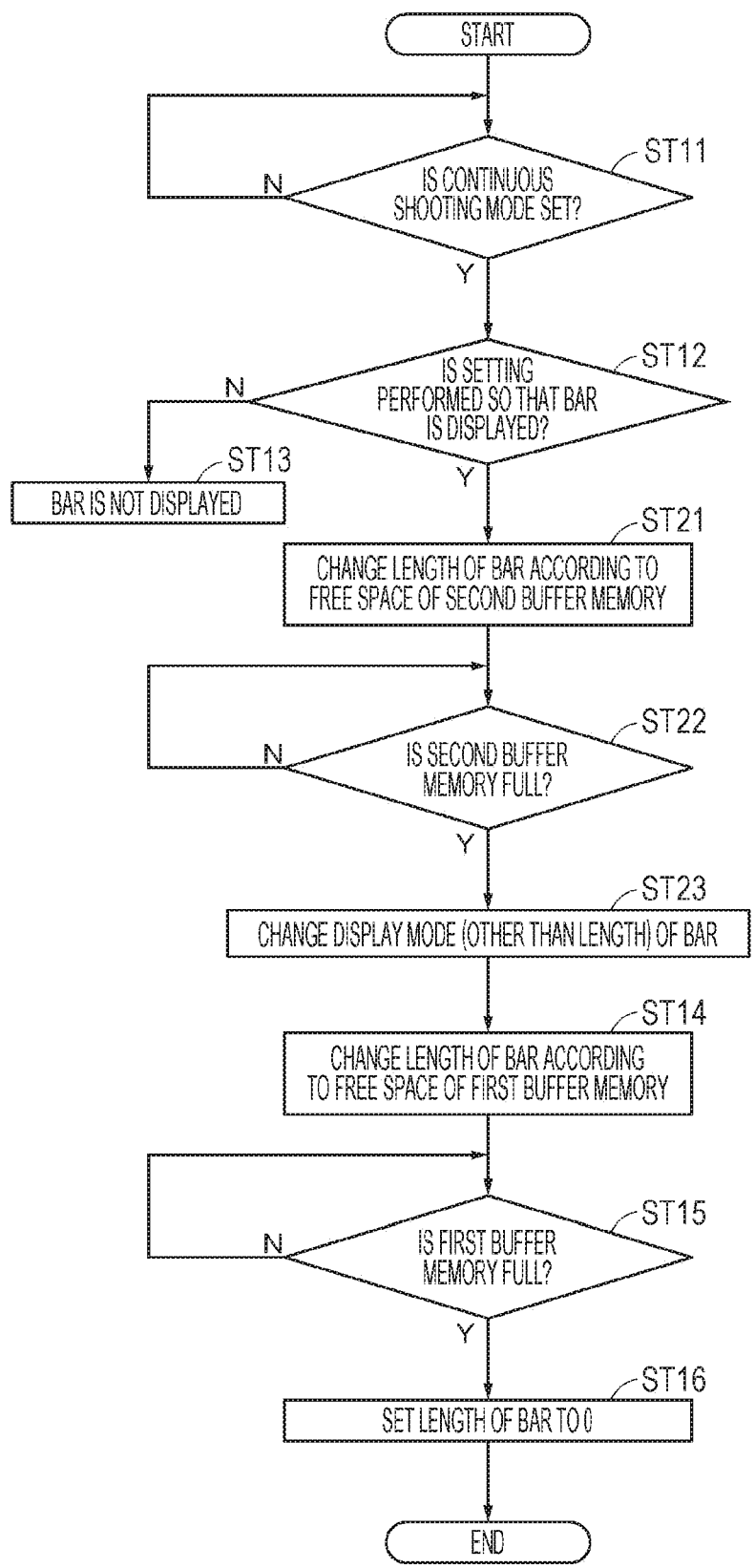
FIG. 15 is a flowchart showing a flow of processing performed in an imaging device according to a modified example.

In the above-described one embodiment, although the example in which the change in the display of the bar BA corresponds to the free space of the first buffer memory 310A has been described, the change in the display of the bar BA may correspond to the free spaces of the first and second buffer memories 310A and 310B. FIG. 15 is a flowchart showing a flow of processing in a case where in which the change in the display of the bar BA may correspond to the free spaces of the first and second buffer memories 310A and 310B. Further, for the same processing as that described in the flowchart shown in FIG. 14, redundant descriptions are appropriately omitted.

In step ST12 of the flowchart of FIG. 15, in a case where it is set to display the bar BA, the processing proceeds to step ST21. In step ST21, the controller 33 calculates the number of images or time that can be shot continuously on the basis of a predetermined shooting rate in accordance with the free space of the second buffer memory 310B by an operation, and changes the length of the bar BA in accordance with the operation result. In addition, the processing proceeds to step ST22.

In step ST22, it is determined whether or not the second buffer memory 310B is full (free space is 0). In a case where the second buffer memory 310B is not full, the processing returns to step ST22, and the processing of step ST22 is repeated. In a case where the second buffer memory 310B is full, the processing proceeds to step ST23.

In a case where the second buffer memory 310B is full, since the free space of the first buffer memory 310A disappears more quickly (see FIG. 7), the degree of shortening of the bar BA becomes larger. Therefore, in step ST23, the display elements (color, thickness, display mode) other than the length of the bar BA are changed at the point when the length of the bar BA changes, and attention is prompted to the user. For example, by changing the color of the bar BA or by blinking the bar BA, the bar BA becomes noticeable. With this arrangement, the user can recognize the step that the free space of the buffer memory 310 is small and recognize the possibility that the shooting rate will become slow. Since the subsequent processing is a similar processing to steps ST14 to ST16, the redundant descriptions will be omitted.

Although the above-described one embodiment describes the configuration example in which the buffer memory 310 has the two buffer memories, the buffer memory 310 is not limited thereto, but a single buffer memory may be used and the buffer memory 310 may have three buffer memories.

The bar BA may extend or retract in a horizontal direction instead of the vertical direction. Whether or not the shooting is performed at the shooting rate slower than the predetermined shooting rate may be displayed by something other than the bar BA. For example, the time or number of images that can be shot on the basis of the predetermined shooting rate may be displayed. However, since the user focuses on the object at the time of continuous shooting, it is preferable that the display be able to be recognized intuitively regarding whether or not the shooting is performed at the shooting rate slower than the predetermined shooting rate. In addition, whether or not the shooting is performed at the shooting rate slower than the predetermined shooting rate may be informed to the user by a warning sound or vibration of the imaging device 1 instead of the display, and may be informed by a combination of the warning sound or vibration and the display.

The imaging device according to the embodiments described above may be incorporated in medical devices such as microscope mirrors, smart phones, computer devices, game devices, robots, crime prevention cameras, and mobile devices (vehicles, trains, airplanes, helicopters, miniature airplanes, construction vehicles, agricultural vehicles, etc.).

The present disclosure can also be realized by a display control device (e.g., a single chip microcomputer) having the controller 33, can also be realized as an imaging system including a plurality of devices, and can also be realized by other methods, programs, and the like. For example, by causing a program performing the control described in one embodiment to be downloaded, and downloading and installing the program by the imaging device (for example, an imaging device provided in the smartphone) that does not have the control function described in one embodiment, it is possible to perform the control described in one embodiment in the imaging device.

In addition, the imaging device of the present disclosure may communicate with an external device such as a smart phone or a tablet type of computer, and the imaging device may be operated by the external device. The UI described in one embodiment may be displayed on a display of the external device. The display of the external device may be a touch panel that can accept input operations. The continuous shooting as described in one embodiment may be performed in the imaging device by operating icons corresponding to the shutter buttons displayed on the display of the external device or physical buttons provided on the external device. In addition, the shooting may be performed by touching the touch panel in addition to the shutter buttons. In addition, the setting can also be set by the user. Further, while touching (long press of the screen), the continuous shooting mode is used, and the continuous shooting as described in one embodiment may be performed.

In the above-described one embodiment, although the continuous shooting of the still image has been described as an example, the technology according to the present disclosure can also be applied to a moving image. For example, when moving image shooting using high-speed shooting (e.g., 120 fps) is performed, the time for which the high-speed shooting can be performed, and the like may be displayed on the display by the bar or the like.

The present disclosure can also take the following configurations.

(1)

A display control device including
a controller configured to perform control displaying, on a display, whether or not shooting is performed at a shooting rate slower than a predetermined shooting rate, after the shooting starts at the predetermined shooting rate.

(2)

The display control device according to (1), in which the controller changes the display according to the number of images or time that is shot continuously on the basis of the predetermined shooting rate.

(3)

The display control device according to (1) or (2), in which
the controller displays a bar that is changed in length within a predetermined range on the display with a display point corresponding to the shooting rate slower than the predetermined shooting rate as a base point.

(4)

The display control device according to (3), in which the controller changes the length of the bar according to the number of images or time that is shot continuously on the basis of the predetermined shooting rate.

(5)

The display control device according to (4), in which
the controller shortens the length of the bar as the number of images or time that is shot continuously on the basis of the predetermined shooting rate becomes smaller, and increases the length of the bar as the number of images or time that is shot continuously on the basis of the predetermined shooting rate becomes larger.

(6)

The display control device according to (4) or (5), in which
the controller shortens the length of the bar as a free space of a buffer memory in which an image captured by the continuous shooting is temporarily stored becomes smaller, and increases the length of the bar as the free space of the buffer memory becomes larger.

(7)

The display control device according to (6), in which
the buffer memory includes a first buffer memory in which the image captured by the continuous shooting is temporarily stored, and a second buffer memory in which the image output from the first buffer memory is temporarily stored, and
the controller calculates the number of images or time that is shot continuously on the basis of the predetermined shooting rate according to the free space of the first buffer memory among the first buffer memory and the second buffer memory, and changes the length of the bar according to a calculation result.

(8)

The display control device according to (6), in which
the buffer memory includes a first buffer memory in which the image captured by the continuous shooting is temporarily stored, and a second buffer memory in which the image output from the first buffer memory is temporarily stored, and
the controller calculates the number of images or time that is shot continuously on the basis of the predetermined shooting rate according to the free spaces of the first buffer memory and the second buffer memory, and changes the length of the bar according to a calculation result.

(9)

The display control device according to any one of (4) to (8), in which
the controller displays the bar in which display elements other than the length of the bar are changed on the display, according to the free space of the buffer memory in which the image captured by the continuous shooting is temporarily stored.

(10)

The display control device according to (9), in which
when a degree of change of the length of the bar changes, the controller displays the bar in which the display elements are changed on the display.

(11)

An imaging device including:
an imager; and
a controller configured to perform control displaying, on a display, whether or not shooting is performed at a shooting rate slower than a predetermined shooting rate, after the shooting starts at the predetermined shooting rate.

(12)

The imaging device according to (11), in which
the controller changes the display according to the number of images or time that is shot continuously on the basis of the predetermined shooting rate.

(13)

The imaging device according to (11) or (12), in which
the controller displays a bar that is changed in length within a predetermined range on the display with a display point corresponding to the shooting rate slower than the predetermined shooting rate as a base point.

(14)

The imaging device according to (13), in which
the imaging device includes a buffer memory in which an image captured by the continuous shooting is temporarily stored, and
the controller shortens the length of the bar as a free space of the buffer memory becomes smaller, and increases the length of the bar as the free space of the buffer memory becomes larger.

(15)

The imaging device according to (14), in which
the buffer memory includes a first buffer memory in which the image captured by the continuous shooting is temporarily stored, and a second buffer memory in which the image output from the first buffer memory is temporarily stored, and
the controller calculates the number of images or time that is shot continuously on the basis of the predetermined shooting rate according to the free space of the first buffer memory among the first buffer memory and the second buffer memory, and changes the length of the bar according to a calculation result.

(16)

The imaging device according to (14), in which the buffer memory includes a first buffer memory in which the image captured by the continuous shooting is temporarily stored, and a second buffer memory in which the image output from the first buffer memory is temporarily stored, and the controller calculates the number of images or time that is shot continuously on the basis of the predetermined shooting rate according to the free spaces of the first buffer memory and the second buffer memory, and changes the length of the bar according to a calculation result.

(17)

The imaging device according to any one of (13) to (16), in which the controller displays the bar in which display elements other than the length of the bar are changed on the display, according to the free space of the buffer memory.

(18)

The imaging device according to (17), in which when a degree of change of the length of the bar changes, the controller displays the bar in which the display elements are changed on the display.

(19)

The imaging device according to any one of (13) to (18), in which settings regarding the display of the bar are possible.

(20)

A display control method including performing, by a controller, control displaying, on a display, whether or not shooting is performed at a shooting rate slower than a predetermined shooting rate, after the shooting starts at the predetermined shooting rate.

REFERENCE SIGNS LIST

1 Imaging device
12A Imaging element
20 Optical image capturing system
33 Controller
34 Graphic I/F
310 Buffer memory
310A First buffer memory
310B Second buffer memory
BA Bar

The invention claimed is:

1. A display control device, comprising:
   a controller configured to:
   control display of a bar on a display unit, wherein a length of the bar displayed on the display unit indicates whether shooting is performed at a shooting rate slower than a specific shooting rate, after the shooting starts at the specific shooting rate;
   temporarily store an image of a plurality of images captured by a continuous shooting operation in a buffer memory; and
   change at least one of a color or a thickness of the bar displayed on the display unit, based on a free space of the buffer memory.

2. The display control device according to claim 1, wherein the controller is further configured to change the display of the display unit based on at least one of the plurality of images or a time of the continuous shooting operation at the specific shooting rate.

3. The display control device according to claim 1, wherein
   the controller is further configured to change the length of the bar within a specific range, and
   the bar comprises a display point corresponding to the shooting rate slower than the specific shooting rate as a base point.

4. The display control device according to claim 3, wherein the controller is further configured to change the length of the bar based on at least one of the plurality of images or a time of the continuous shooting operation at the specific shooting rate.

5. The display control device according to claim 4, wherein the controller is further configured to:
   shorten the length of the bar as at least one of the plurality of images or the time of the continuous shooting operation becomes smaller, and
   increase the length of the bar as at least one of the plurality of images or the time of the continuous shooting operation becomes larger.

6. The display control device according to claim 4, wherein the controller is further configured to:
   shorten the length of the bar as the free space of the buffer memory becomes smaller, and
   increase the length of the bar as the free space of the buffer memory becomes larger.

7. The display control device according to claim 6, wherein
   the buffer memory includes:
   a first buffer memory in which the image captured by the continuous shooting operation is temporarily stored, and
   a second buffer memory in which an image output from the first buffer memory is temporarily stored; and
   the controller is further configured to:
   calculate at least one of the plurality of images or the time of the continuous shooting operation at the specific shooting rate based on a free space of the first buffer memory, and
   change the length of the bar based on the calculation.

8. The display control device according to claim 6, wherein
   the buffer memory includes:
   a first buffer memory in which the image captured by the continuous shooting operation is temporarily stored, and
   a second buffer memory in which an image output from the first buffer memory is temporarily stored; and
   the controller is further configured to:
   calculate at least one of the plurality of images or the time of the continuous shooting operation at the specific shooting rate based on a free space of the first buffer memory and a free space of the second buffer memory, and
   change the length of the bar based on the calculation.

9. The display control device according to claim 1, wherein
   based on a specific degree of change of the length of the bar, the controller is further configured to display the bar in which the color and the thickness of the bar are changed on the display unit.

10. An imaging device, comprising:
    an imager;
    a buffer memory, and
    a controller configured to:
    control display of a bar on a display unit, wherein a length of the bar displayed on the display unit indicates whether shooting is performed at a shooting rate slower than a specific shooting rate, after the shooting starts at the specific shooting rate;

temporarily store an image of a plurality of images captured by a continuous shooting operation in the buffer memory; and change at least one of a color or a thickness of the bar displayed on the display unit, based on a free space of the buffer memory.

11. The imaging device according to claim 10, wherein the controller is further configured to change the display of the display unit based on at least one of the plurality of images or a time of the continuous shooting operation at the specific shooting rate.

12. The imaging device according to claim 10, wherein the controller is further configured to change the length of the bar within a specific range, and the bar comprises a display point corresponding to the shooting rate slower than the specific shooting rate as a base point.

13. The imaging device according to claim 12, wherein the controller is further configured to:

shorten the length of the bar as the free space of the buffer memory becomes smaller, and increase the length of the bar as the free space of the buffer memory becomes larger.

14. The imaging device according to claim 13, wherein the buffer memory includes:

a first buffer memory in which the image captured by the continuous shooting operation is temporarily stored, and a second buffer memory in which an image output from the first buffer memory is temporarily stored, and the controller is further configured to:

calculate at least one of the plurality of images or a time of the continuous shooting operation at the specific shooting rate based on a free space of the first buffer memory among the first buffer memory and the second buffer memory, and change the length of the bar based on the calculation.

15. The imaging device according to claim 13, wherein the buffer memory includes:

a first buffer memory in which the image captured by the continuous shooting operation is temporarily stored, and a second buffer memory in which an image output from the first buffer memory is temporarily stored; and the controller is further configured to:

calculate at least one of the plurality of images or a time of the continuous shooting operation at the specific shooting rate based on a free space of the first buffer memory and a free space of the second buffer memory, and change the length of the bar based on the calculation.

16. The imaging device according to claim 12, wherein the controller is further configured to set a pattern of display of the bar.

17. The imaging device according to claim 10, wherein based on a specific degree of change of the length of the bar, the controller is further configured to display the bar in which the color and the thickness of the bar are changed on the display unit.

18. A display control method, comprising:

controlling, by a controller, display of a bar on a display unit, wherein a length of the bar displayed on the display unit indicates whether shooting is performed at a shooting rate slower than a specific shooting rate, after the shooting starts at the specific shooting rate;

temporarily storing, by the controller, an image of a plurality of images captured by a continuous shooting operation in a buffer memory; and changing, by the controller, at least one of a color or a thickness of the bar displayed on the display unit, based on a free space of the buffer memory.

* * * * *